Jan. 19, 1954     R. J. SHERMAN     2,666,230
MOLDING APPARATUS FOR MOLDING MATERIAL
Filed Nov. 9, 1950     2 Sheets-Sheet 1
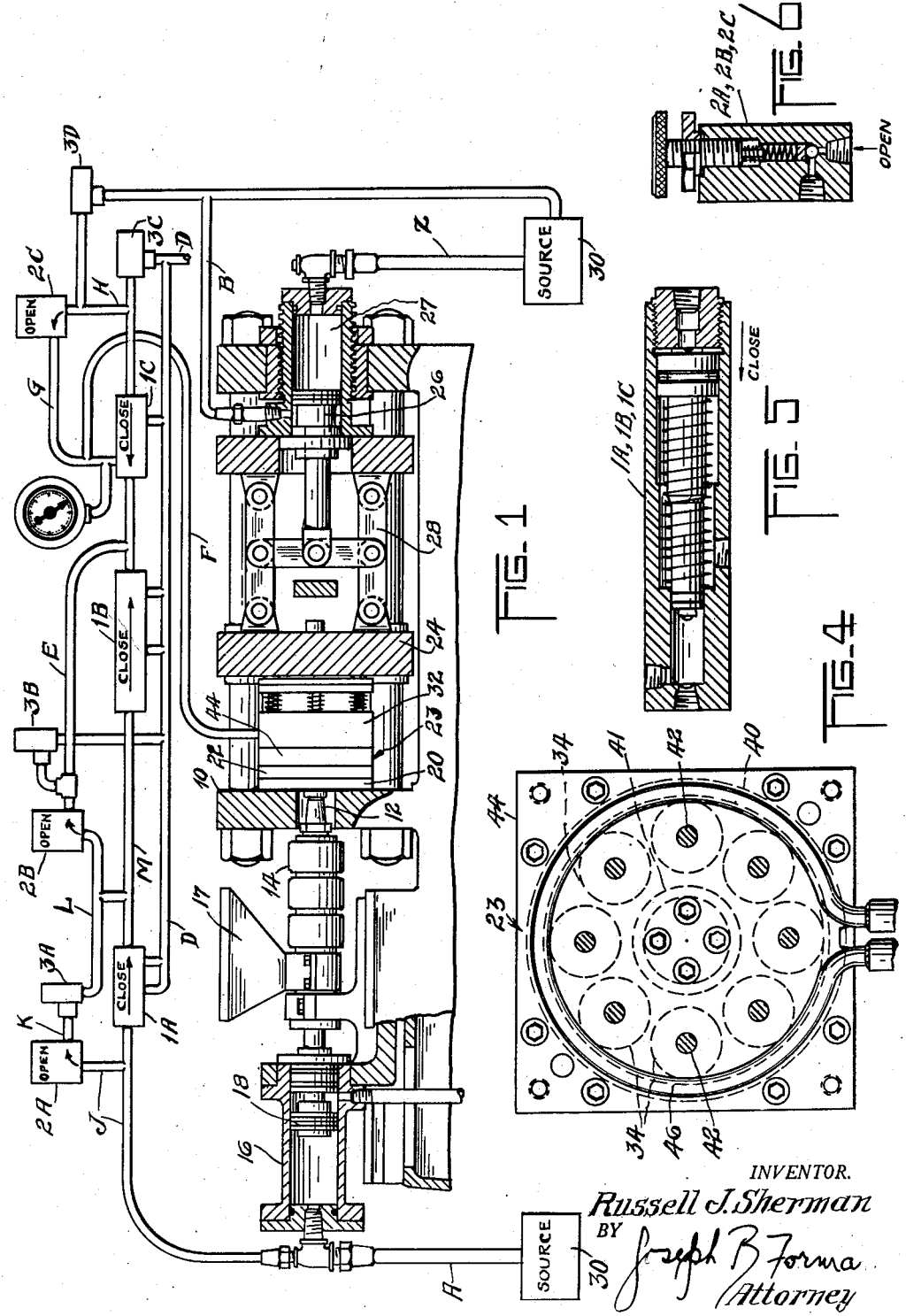
INVENTOR.
Russell J. Sherman
BY
Joseph B. Forma
Attorney

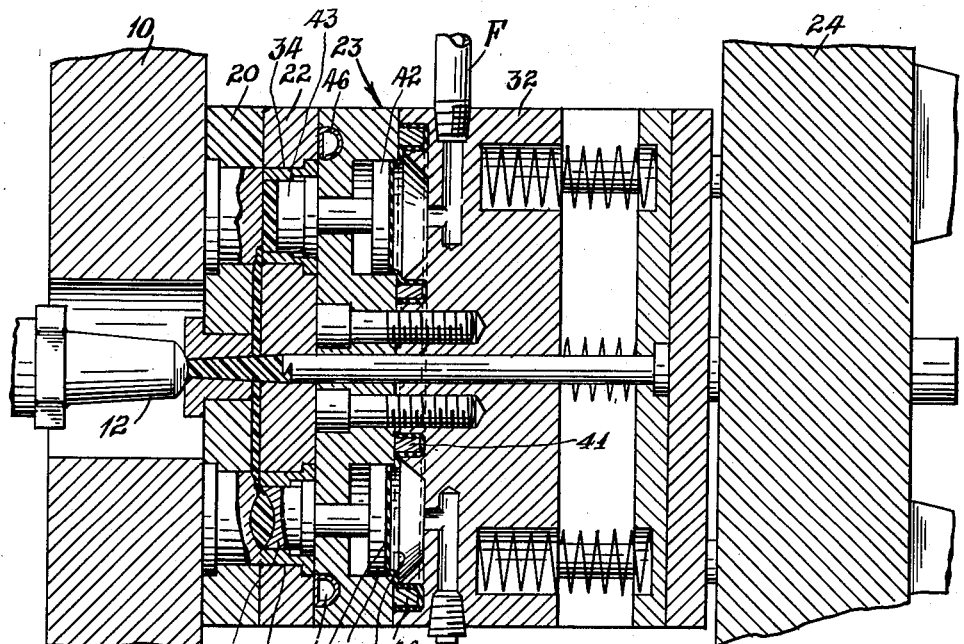
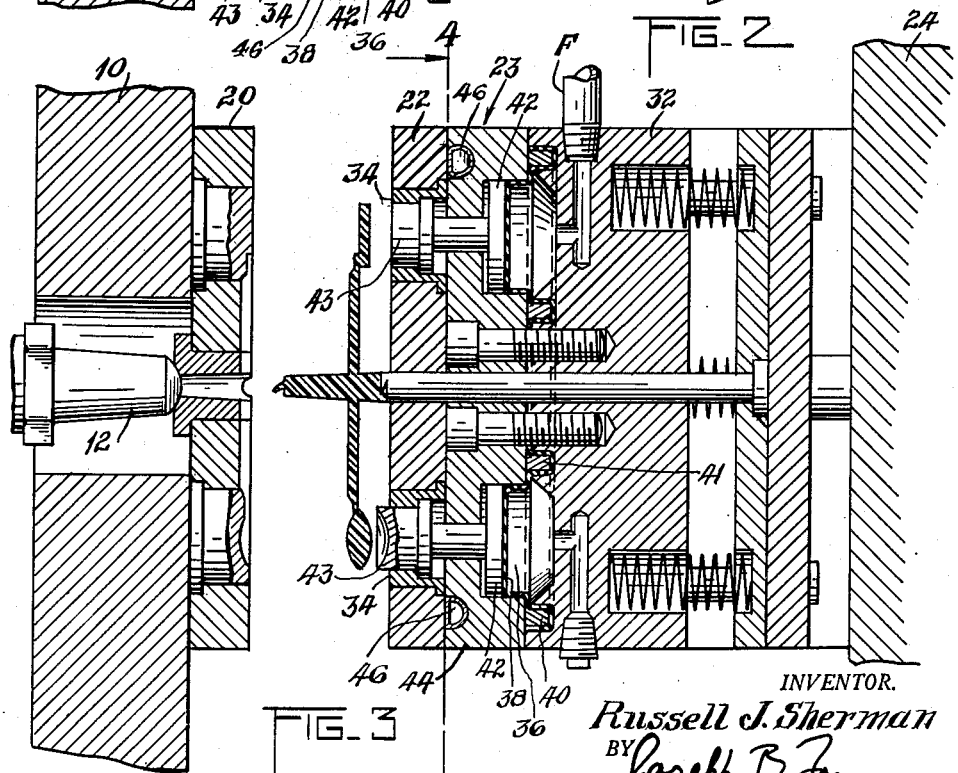

Patented Jan. 19, 1954

2,666,230

UNITED STATES PATENT OFFICE 2,666,230

MOLDING APPARATUS FOR MOLDING MATERIAL

Russell J. Sherman, Great Neck, N. Y.

Application November 9, 1950, Serial No. 194,856

6 Claims. (Cl. 18—30)

This invention relates to pressure operated injection molding and/or diecasting machines. The invention is more particularly adapted to such molding and/or casting machines wherein the mold sections are firmly locked in a closed position under pressure during the injection cycle and the period of time required for solidifying the molded parts.

Molding or casting apparatus in general includes separable mold or die members having cavities formed to the shape of the parts to be molded. In operation the molten or plasticized material is injected into the die or mold cavities through entrances during a period of time when the constituent members of the mold or die are held together under pressure, referred to as the injection cycle, and the material is permitted to cool or set with pressure removed, during a period called the cooling and solidifying period, after which the mold or die members are disengaged and the finished product is removed from the mold or die.

In current apparatus of the type herein referred to, the aforesaid procedure results in some distortion of the formed article. This distortion of shape and change of dimension of a molded part is a characteristic of the machine and is believed due to the shrinkage of the molten material as it cools to the solid state.

It is a prime object of my invention to provide improved molding and/or casting apparatus wherein the shrinkage or distortion of the formed article due to cooling of the molten material is greatly reduced.

It is a further object of my invention to provide molding or casting apparatus utilizing multiple cavity molds or dies wherein the apparatus is adapted to simultaneously mold or cast several articles of different shapes and sizes in one cycle of operation.

It is a further object of my invention to provide an improved means for ejecting the molded or cast articles from the molds or dies at the completion of the molding cycle.

In general my invention involves the principle of applying a uniform pressure to the cavity wherein the article is being molded during the period of cooling from the molten to the solid state and permits the use of predetermined individual pressures where several articles of different sizes and shapes are to be simultaneously molded.

Further objects and advantages of the invention will become more apparent from the following description and accompanying drawing herein.

Figure 1 is a side view of molding apparatus including the invention.

Figure 2 is a sectional view of the base and movable platen of the apparatus in closed position.

Figure 3 is a view of the apparatus of Figure 2 in open position.

Figure 4 is a top view of a mold base embodying the invention equipped to serve a multiple cavity mold.

Figure 5 is a view partially in section of a valve such as 1A, 1B and 1C.

Figure 6 is a view partially in section of a valve such as 2A, 2B and 2C.

Referring to the drawings in detail and Figure 1 in particular, a machine incorporating the invention includes a stationary platen 10, injection nozzle 12, heating chamber 14, hopper 17, injection cylinder 16 and injection piston 18. A stationary mold 20 is secured to the fixed platen 10, and a counterpart movable mold 22 is secured to a mold base 23 which in turn is secured to a movable platen 24 adapted to be moved by means of a toggle mechanism 28, motivated by a piston 26 within cylinder 27.

The pressure medium required to operate the apparatus is obtained from a source 30 and transmitted by means of connecting lines to various components of the system through suitable valves as will be hereinafter described.

In one aspect, my invention provides means for applying a desired pressure on the molded parts during the cooling and solidifying period of the molding cycle. The continued application of pressure upon the molded parts during the cooling and solidifying period forces the parts to conform to the size and shape of the mold cavities.

Referring to Figures 2 and 3, my invention includes a new and improved mold assembly. Moveable mold 22 is attached to a cooperating pressure plug plate 44 adapted to simultaneously serve a plurality of mold stations 34. Pressure chamber block 32 is formed with a chamber 36, equipped with a suitable expandable diaphragm 38, which is retained in position by means of mounting rings 40 and 41.

Each mold station 34 is provided with a pressure plug 42 mounted in pressure plug plate 44. Each pressure plug 42 is adapted to apply pressure to a die member 43 at each mold station 34. Pressure plug plate 44 is also adapted to receive the mold temperature control element 46.

A further aspect of my invention provides means for ejecting the product from the molds or dies after the molds or dies are opened at the completion of the molding cycle. Pressure plugs 42 are arranged to move die members 43 to the edge of or beyond the surface of mold 22 for the purpose of plug 43 ejecting the product.

The pressure system utilized with the apparatus includes a line Z controlled by a suitable valve (not shown) adapted to provide pressure to the cylinder 27 associated with piston 26 to close the mold.

A plurality of pressure operated line opening valves 1A, 1B and 1C, such as shown in Figure 5, are interconnected by means of lines J, K, L, E, M, F, G, H, and D, with a series of pressure operated line opening check valves 2A, 2B, and 2C, such as shown in Figure 6, and adjustable relief valves 3A, 3B and 3C (not shown) and operated to control the pressures applied to the mold as hereinafter described.

To accomplish my object of retaining the material under pressure during the cooling and hardening period I will first describe a phase of operation which I call injection-compression cycle. The injection compression cycle as referred to herein includes the injection of the molten materials to the dies or molds and the cooling and solidifying of the material to form a product.

Referring to the drawings, upon opening pressure line A, a pressure is applied to the injection cylinder 16, injection piston 18 is moved forward under the line pressure forcing a charge of raw material from hopper 17 into the heater chamber 14 and ejecting the formerly heated material through a nozzle 12, sprue bushing, runners and gates into the mold cavities formed by mold members 20 and 22. When the molds are filled, or nearly filled, the pressure in line A rises and is transmitted through line J to line valve 1A closing said valve. With valve 1A closed the pressure in line J continues to increase and causes line opening valve 2A to open and pass the pressure medium through line K and valve 3A to lines L and M. As lines L and M are filled with the pressure medium, the pressure reaches a level sufficiently high to cause valve 1B to close.

The time required for valve 1B to close is determined by the rate of flow through valve 3A, and permits valve 1B to act as a delay valve, insuring the filling of the molds before pressure is built up in the pressure chamber 36.

Closure of valve 1B results in a back pressure in lines L and M, causing line opening valve 2B to open and permit the medium under pressure to flow into line E. At this point, with valve 1B closed and valve 1C open, the medium under pressure flows through valve 1C and line F to the pressure chamber block 32, pressure chamber 36 and cause the associated expandable diaphragm 38 to expand. Relief valve 3B in line E is used as a control for the pressure in the line and serves as a by-pass to drain line D.

The presence of a medium order pressure in pressure chamber 36 acting against expandable diaphragm 38 causes pressure plug 42 to place moveable die or mold members 43 in pressured contact with stationary mold member 20. The amount of pressure exerted on each mold member is determined by the cross-sectional area of the head of pressure plug 42, and permits use of a multiple cavity mold wherein each mold may be retained in position under a different pre-determined pressure.

Removal of pressure from line A and retraction of piston 18 causes valves 2A and 2B to close, valve 1A to open because of exhaust through valve 1A to drain line D. With the opening of valve 1B, pressure chamber 36 is provided with an exhaust path through line F, valve 1C, line E and valve 1B to drain line D, completing the injection compression cycle.

The cycle for ejection of parts from the apparatus is set in motion when line B is opened to supply the medium under pressure to cylinder 27, and piston 26, to open the mold by means of toggle lever mechanism 28. When the piston 26 reaches the end of its stroke the pressure in line B rises and is transmitted through valve 3D and line H to valve 1C and closes valve 1C. Closure of valve 1C causes the pressure in line H to open the line opening check valve 2C permitting the medium under pressure to pass from line H to line G, F and the pressure chamber 36, diaphragm 38 and pressure plug 42, causing the ejection of the product. Removal of pressure from line B causes valve 2C to close and valve 1C to open by exhaustion through lines H and B permitting the pressure chamber 36 to exhaust through lines F and E and valve 1B to line D setting the system back to its initial state.

While I have herein shown and described certain preferred embodiments of my invention, I wish it to be understood that I do not confine myself to all of the precise detail herein set forth, as modification and variations may be made without departing from the spirit of the invention or exceeding the scope of the appended claims.

What is claimed is:

1. Injection molding apparatus including a mold comprising fixed die members and moveable die members forming a plural cavity mold when placed in engagement, means for injecting a moldable material into said mold, a pressure plug plate having a plurality of pressure plugs, a pressure plug in engagement with each of said moveable die members, a pressure chamber block, an expandable diaphragm between said pressure chamber block and said pressure plug plate and adapted to impart pressure to said pressure plugs and means for introducing a medium having a predetermined pressure to said pressure chamber block during the cooling and solidifying of a moldable material injected into said mold cavities.

2. Injection molding apparatus including a plural cavity mold comprising a fixed die member and a moveable die member forming a mold cavity when placed in engagement, means for injecting a moldable material into said cavities, means for maintaining said moldable material in each of said cavities under individual predetermined pressures during cooling and solidifying within said mold cavities, said means being adapted to eject said molded material after solidification of said moldable material.

3. Injection molding apparatus including a mold comprising fixed die members and moveable die members forming a plural cavity mold when placed in engagement, means for injecting a moldable material into said mold, a pressure plug plate having a plurality of pressure plugs, a pressure plug in engagement with each of said moveable die members, a pressure chamber block, an expandable diaphragm between said pressure chamber block and said pressure plug plate and adapted to impart pressure to said pressure plugs, means for introducing a medium a predetermined pressure to said pressure chamber block during the cooling and solidifying of a moldable material injected into said mold cavities, said means being adapted to eject said molded material after solidification of said moldable material.

4. Injection molding apparatus including a fixed platen and a moveable platen, a split cavity mold comprising a fixed mold member and a moveable mold member having a plurality of molds and secured to said fixed and moveable platens respectively, said moveable mold member comprising a plurality of molds, each of said molds including a moveable die member, a pressure plug plate adjacent the rear of said moveable mold member, one end of a pressure plug secured to said moveable die members and extending through said pressure plug plate, a pressure chamber block including an expandable diaphragm adjacent said pressure plug plate and having said diaphragm in contact with each of the respective extremities of said pressure plugs, means for injecting a moldable material into said mold, and means for introducing a pressure medium into said pressure chamber after said material has been injected into said mold.

5. Injection molding apparatus including a fixed platen and a moveable platen, a split cavity mold comprising a fixed mold member and a moveable mold member having a plurality of molds and secured to said fixed and moveable platens respectively, said moveable mold member comprising a plurality of molds, each of said molds including a moveable die member, a pressure plug plate adjacent the rear of said moveable mold member, one end of a pressure plug secured to said moveable die member and extending through said pressure plug plate, a pressure chamber block including an expandable diaphragm adjacent said pressure plug plate and having said diaphragm in contact with each of the respective extremities of said pressure plugs, a pressure medium source, a closed cylinder including a pressure actuated ram extending from said cylinder and adapted to be actuated by said pressure medium source to inject a moldable material into said mold, and delay means operative by said pressure medium source to apply a pressure medium to said pressure chamber block after said moldable material has been injected into said mold.

6. Injection molding apparatus including a mold comprising fixed die members and moveable die members forming a plural cavity mold when placed in engagement, means for injecting a moldable material into said mold, a pressure plug plate having a plurality of pressure plugs, a pressure plug in engagement with each of said moveable die members, means for imparting predetermined individual pressures to each of said pressure plugs after filling and during cooling and solidifying of the moldable material within said mold cavity, and means for ejecting said moldable material after solidification thereof.

RUSSELL J. SHERMAN.

References Cited in the file of this patent

UNITED STATES PATENTS

| Number | Name | Date |
|---|---|---|
| 2,233,057 | Luce | Feb. 25, 1941 |
| 2,423,914 | Wacker | July 15, 1947 |
| 2,443,826 | Johnson | June 22, 1948 |
| 2,470,402 | Jobst | May 17, 1949 |

OTHER REFERENCES

Modern Plastics, September 1945, pp. 146–150.